UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

SHOE-FILLER.

1,138,909.  Specification of Letters Patent.  Patented May 11, 1915.

No Drawing. Original application filed May 11, 1908, Serial No. 432,083. Divided and this application filed July 1, 1912. Serial No. 707,019.

*To all whom it may concern:*

Be it known that I, ANDREW THOMA, a citizen of the United States, and resident of Cambridge, county of Middlesex, State of Massachusetts, have invented an Improvement in Shoe-Fillers, of which the following is a description.

My present invention relates to shoe-filling compositions and this application is a division of my previous application Serial No. 432,083, filed May 11, 1908, and now Patent 1,032,312, dated July 9, 1912. As disclosed in that application, which is in part a derivative of my pioneer or foundation filler Patent No. 832,002, September 25, 1906, I have found that several materials have qualities which adapt them for use as binders in shoe-filling compositions, *i. e.* compositions used to fill up even or occupy the cavity of the inner soles or shoe bottoms of shoes of certain kinds. These compositions are usually composed of cork or ground leather and a suitable binder mixed together to a sticky, plastic, sluggishly moldable dough. Wax-tailings, a product of petroleum distillation, is, as stated, in that application, such a binder, and because it is sticky, tenacious, always the same, and easily responsive, or sensitive, to heat, is very well suited to the purpose. The low-melting, stickier kinds, however, have certain objections, *i. e.* they are too sticky or runny, too penetrative or easily absorbed by the body material or ground cork, etc., and are so sticky as to adhere to and follow the knife of the operator in the act of filling the shoe-bottom cavity when used cold. Hence, it is better to introduce with this waxy sticky material or its equivalent, some sleeking or smoothing and restraining, slow-drying component. One that I have found very useful for the purpose is some natural vegetable gum such as gum arabic; and the combination of a waxy base of a permanently sticky, tenacious, heat-responsive and quick-setting adhesive, with a gum of the kind indicated, is the subject of my present invention. The gums of which gum arabic is the type are offered to the trade in great variety, both as to kinds and quality, including a great many adulterations and substitutes, which for economic reasons are frequently found either separate or in with the genuine gum. The larger number are used for mucilaginous purposes, while others, such for instance as gum tragacanth, are used more for stiffening or sizing purposes, but all these are well adapted to my purpose. They all swell up with water into a more or less tough plastic mass. This quality makes such a gum of particular use in the present relation. Some of the stickier low melting wax tailings, which may otherwise be taken as one form of useful binder, are unfit in their natural condition for the desired use in a shoe-bottom because of the qualities already criticized, such as being too sticky, runny, penetrative, too low-melting, etc. Filler material made therefrom would be too unstable and soft, penetrative and apt to stick to and follow the knife of the operator (if either the filler or knife were cold). These objections are overcome to an admirable degree by gums of the type stated and particularly by gum arabic, so that the mass composed of, say, wax tailings, gum arabic, and comminuted cork, retains in the prepared filler-mass proper cohesive and adhesive qualities, will not harden or change, will respond readily to heating means for spreading in the shoe-bottom, will set quickly on cooling and will assist in the spreading of the filler. The gum keeps the adhesive from penetrating the porous filler-body material to any undesirable degree, so that such filler has each particle or granule coated exteriorly with a non-hardening adhesive, while each of such particles or granules retains constantly its natural elasticity interiorly or at the core. The filler when set, on account of the firm-setting or restraining component (the vegetable gum) holds the soft, heat-sensitive, sticky binder in check *i. e.*, it restrains these attributes of the binder permanently thereafter (as explained at length in my parent application aforesaid).

No proportions are given here, as the constituents of my composition vary greatly in their individual quality. By preference, I mix the tailings and the dry gum, and then add water and stir to a free-flowing paste, then add finally the filler-body material of ground leather, granular cork, or any other like porous granular material. That is to say, the vegetable gum is introduced before the penetrative ingredient (the wax tailings, for example) has had a chance to penetrate the cork, and hence the latter remains resilient. The compound seems to be more smoothly and quickly mixed than if I add the water to the gum before mixing. Or, I may mix the powdered gum and the granular body-material dry, and then add the tailings.

I may leave out the water in packaging and may also leave out the granular cork or the like, permitting the manufacturer to add these as desired on his premises and mix accordingly. Whenever ground leather is used in part or whole, the excess of water in the paste first enters and moistens the leather and thereby precludes the entering or penetrating of the sticky binder, preserving in the mass the natural resiliency of the leather or other body-material.

I may eke out the gum arabic by adding portions of other gums or dextrin, starch paste, gluten, glue, casein, albumen, or soluble silicates or their equivalents, though I have found gum arabic alone, when gelatinized by the addition of water in the manner indicated above, to be very good.

Although I have generally found wax-tailings to be very efficient, I may use other substances of the kind indicated in the application as additions to or substitutes for the tailings.

The vegetable gum in the filler composition as explained may also be rendered pliable and waterproof by adding to the same the necessary fluxing means for various oils or fats which render the binder fluid and when set tenacious, water-repellent and permanent.

Having described my invention, what I claim as new, and desire to secure by Letters Patent is:

1. A shoe filler composition, comprising gum arabic and wax tailings.

2. A shoe filler composition, comprising a mucilaginous gum and wax tailings.

3. A shoe filler composition, comprising a mucilaginous vegetable gum, a permanently sticky, tenacious, slow-drying waxy adhesive of the type of wax tailings, and a resilient, chunky filling material mixed together to a doughy sticky mass, adherent to leather, and permanently pliable.

4. A shoe filler composition for a shoe-filling material, comprising a restraining agent consisting at least in part of a natural vegetable gum, an adhesive material consisting at least in part of wax tailings, moisture, and a filler-body material mixed together to a doughy sticky mass, adherent to leather, and permanently pliable.

5. A shoe filler composition, comprising gum arabic, wax tailings, moisture, and comminuted cork, the cork having approximately its natural resiliency.

6. A shoe filler composition, comprising gum arabic, wax tailings, and comminuted body-material admixed to the consistency of and for a shoe-filling composition.

7. The combination, in a shoe-filling compound, of a permanently sticky, tenacious, slow-drying adhesive, gum arabic, moisture, and a porous filler-body material mixed together to a doughy sticky mass, adherent to leather, and permanently pliable.

8. A shoe-filling compound, comprising a permanently sticky, tenacious binder, gum arabic gelatinized by water, and a comminuted absorbent resilient filler-body material, the materials being so proportioned and mixed that the absorption of the binder into the particles of the body-material is only partial, whereby each of said particles retains a core practically free from the absorbable binder, said core having its natural resiliency practically intact.

9. A shoe bottom filler, consisting of a doughy mass having a plastic, sluggishly moldable consistency, composed of comminuted filler body-material held in said mass condition by a sticky binder, said binder consisting at least in part of a sticky and normally heat-responsive base and a restraining gum of the gum-arabic type in a proportion capable of holding in check, when in a shoe, the said normal heat-sensitiveness of the base so as to maintain a practical stiffness and prevent melting and softening of the filler under usual conditions of use.

10. A shoe bottom filler, consisting of a doughy mass having a plastic, sluggishly moldable consistency, composed of comminuted filler body-material held in said mass condition by a sticky binder, said binder consisting at least in part of a sticky and normally penetrative base and a restraining gum of the gum-arabic type in a proportion capable of holding in check the said normal penetrativeness of said base under usual conditions of use.

11. A shoe-bottom filler, comprising a mucilaginous gum, a solvent therefor, softening means for rendering the gum pliable and tenacious when set in the filler mass, and comminuted body material mixed together to a doughy sticky mass, adherent to leather, and permanently pliable.

12. A shoe-bottom filler, comprising a sticky binder consisting at least in part of a stiffening vegetable gum, a mucilaginous component, and comminuted filler-body material mixed together to a doughy sticky mass, adherent to leather, and permanently pliable.

13. A shoe bottom filler, consisting of a sticky water repellent doughy mass having a plastic, sluggishly moldable consistency for application to the shoe-bottom, composed of comminuted filler body-material held in said mass condition by a sticky binder, said binder consisting at least in part of a normally penetrative base and a restraining and softening gum of the gum-arabic type in a proportion capable of holding in check said penetrative base and maintaining a practical stiffness and unchangeable condition in the binder under normal conditions of use in the shoe.

14. A shoe-bottom filler, comprising a vegetable gum which swells with water into a somewhat tough plastic mass, a solvent therefor, means for rendering the solution water-repellent, and comminuted filler-body material mixed together to a doughy sticky mass, adherent to leather, and permanently pliable.

15. A shoe-bottom filler, comprising a gelatinous gum of the character described, a waterproofing component, and comminuted filler-body material mixed together to a doughy sticky mass, adherent to leather, and permanently pliable.

16. A shoe-bottom filler, comprising a gelatinous gum of the character described, a sticky binder therefor, and comminuted filler-body material mixed together to a doughy sticky mass, adherent to leather, and permanently pliable.

In testimony whereof, I have signed my name to this specification, in the presence of two subscribing witnesses.

ANDREW THOMA.

Witnesses:
EDWARD MAXWELL,
WALLACE A. SHIPTON.